(12) United States Patent
Li et al.

(10) Patent No.: US 10,122,310 B2
(45) Date of Patent: Nov. 6, 2018

(54) TACTILE VIBRATION CONTROL SYSTEM AND METHOD FOR SMART TERMINAL

(71) Applicant: Goertek Inc., Weifang (CN)

(72) Inventors: Bo Li, Weifang (CN); Yongqiang Feng, Weifang (CN); Shasha Lou, Weifang (CN)

(73) Assignee: Goertek Inc., Weifang, Shandong (CN)

( * ) Notice: Subject to any disclaimer, the term of this patent is extended or adjusted under 35 U.S.C. 154(b) by 133 days.

(21) Appl. No.: 15/324,237

(22) PCT Filed: Jun. 23, 2016

(86) PCT No.: PCT/CN2016/086931
§ 371 (c)(1),
(2) Date: Jan. 5, 2017

(87) PCT Pub. No.: WO2017/113651
PCT Pub. Date: Jul. 6, 2017

(65) Prior Publication Data
US 2018/0183372 A1 Jun. 28, 2018

(30) Foreign Application Priority Data
Dec. 31, 2015 (CN) .......................... 2015 1 1031780

(51) Int. Cl.
*H04B 3/36* (2006.01)
*H02P 25/032* (2016.01)
(Continued)

(52) U.S. Cl.
CPC ........... *H02P 25/032* (2016.02); *G05D 19/02* (2013.01); *H02K 33/04* (2013.01); *G08B 6/00* (2013.01)

(58) Field of Classification Search
USPC ......... 340/407.1, 856.4, 7.6, 965, 4.12, 582; 318/129, 128, 460
See application file for complete search history.

(56) References Cited

U.S. PATENT DOCUMENTS

| | | | |
|---|---|---|---|
| 4,897,582 A | * | 1/1990 | Otten ..................... B64G 1/365 244/164 |
| 5,388,992 A | | 2/1995 | Franklin et al. |

(Continued)

FOREIGN PATENT DOCUMENTS

| | | |
|---|---|---|
| CN | 1378898 A | 11/2002 |
| CN | 103793050 A | 5/2014 |

(Continued)

OTHER PUBLICATIONS

Office Action (The First Office Action) dated May 22, 2017, by the State Intellectual Property Office of the People's Republic of China in corresponding Chinese Patent Application No. 201511031780.7 and an English Translation of the Office Action. (16 pages).

(Continued)

*Primary Examiner* — Bentsu Ro
*Assistant Examiner* — Iftekhar Mustafa
(74) *Attorney, Agent, or Firm* — Buchanan Ingersoll & Rooney PC

(57) ABSTRACT

A tactile vibration control system and method for a smart terminal. The system includes: a command generator, a tactile driver, a linear resonant actuator, a sensing module, a feedback unit and a comparator; by arranging a plurality of sensors that monitor or sense the vibrating status of the linear resonant actuator, channels of the sensor signals are generated when the actuator vibrates; the feedback unit sends the sensing signals characterizing the physical quantities related to the vibration modes output by the plurality of sensors to the comparator as the feedback signal; and the comparator generates an error signal according to the feedback signal and a desired signal in the input signal and sends the error signal to the command generator so that the command generator adjusts the generated initial command- (Continued)

ing signal according to the error signal and achieves the close-loop control of the linear resonant actuator.

19 Claims, 3 Drawing Sheets

(51) Int. Cl.
*G05D 19/02* (2006.01)
*H02K 33/04* (2006.01)
*G08B 6/00* (2006.01)

(56) References Cited

U.S. PATENT DOCUMENTS

| | | | |
|---|---|---|---|
| 5,610,848 | A | 3/1997 | Forwell |
| 6,249,752 | B1 * | 6/2001 | Cunningham ........ G01F 1/8413 702/100 |
| 6,850,151 | B1 | 2/2005 | Calhoun et al. |
| 7,346,172 | B1 | 3/2008 | Begault |
| 9,552,066 | B2 | 1/2017 | Taninaka et al. |
| 9,606,628 | B2 | 3/2017 | Taninaka et al. |
| 9,918,154 | B2 | 3/2018 | Timothy et al. |
| 2002/0051332 | A1 | 5/2002 | Miyajima et al. |
| 2006/0119573 | A1 | 6/2006 | Grant et al. |
| 2006/0139840 | A1 | 6/2006 | Yasuda et al. |
| 2007/0092087 | A1 | 4/2007 | Bothra et al. |
| 2013/0106589 | A1 | 5/2013 | Posamentier |
| 2013/0106756 | A1 | 5/2013 | Kono et al. |
| 2013/0165226 | A1 | 6/2013 | Thorner |
| 2014/0028547 | A1 | 1/2014 | Bromley et al. |
| 2014/0118126 | A1 | 5/2014 | Garg et al. |
| 2015/0332565 | A1 | 11/2015 | Cho et al. |
| 2016/0234588 | A1 | 8/2016 | Timothy et al. |
| 2016/0258758 | A1 * | 9/2016 | Houston ................ G01C 21/20 |
| 2016/0300388 | A1 | 10/2016 | Stafford et al. |
| 2017/0034612 | A1 | 2/2017 | Timothy et al. |
| 2017/0156662 | A1 | 6/2017 | Goodall et al. |
| 2017/0182517 | A9 | 6/2017 | Houston et al. |
| 2017/0188129 | A1 | 6/2017 | Sandia et al. |

FOREIGN PATENT DOCUMENTS

| | | |
|---|---|---|
| CN | 104954566 A | 9/2015 |
| CN | 105027418 A | 11/2015 |
| CN | 204760039 U | 11/2015 |
| CN | 205485661 U | 8/2016 |
| CN | 205581671 U | 9/2016 |
| JP | H 10240354 A | 9/1998 |

OTHER PUBLICATIONS

Office Action (The First Office Action) dated May 27, 2017, by the State Intellectual Property Office of the People's Republic of China in Chinese Patent Application No. 201511031603.9 and an English Translation of the Office Action. (19 pages).

Niu P. et al. "Process Control System" Electronic Industry Press, pp. 298-302, Jun. 30, 2011.

Written Opinion (PCT/ISA/237) dated Sep. 21, 2016, by the State Intellectual Property Office of the P.R.C. for International Application No. PCT/CN2016/086931.

Written Opinion (PCT/ISA/237) dated Oct. 11, 2016, by the State Intellectual Property Office of the P.R.C. for International Application No. PCT/CN2016/090873.

Office Action issued by the U.S. Patent and Trademark Office in the U.S. Appl. No. 15/324,151, dated Apr. 18, 2018, U.S. Patent and Trademark Office, Alexandria, VA. (16 pages).

Notice of Allowance issued by the U.S. Patent and Trademark Office in the U.S. Appl. No. 15/312,435, dated Mar. 27, 2018, U.S. Patent and Trademark Office, Alexandria, VA. (26 pages).

* cited by examiner

TACTILE VIBRATION CONTROL SYSTEM AND METHOD FOR SMART TERMINAL

TECHNICAL FIELD

The present disclosure relates to the field of tactile feedback technology, and in particular, a tactile vibration control system and method for a smart terminal.

BACKGROUND

For years, there has been intensive exploration and utilization of reception channels for both visual and auditory information in the technical fields of communication and media. Even though tactile sensation has applications in technical fields like virtual reality and game special effects, etc., such as for applications in remote or indirect operation, simulation of shooting, explosion or the like sceneries by means of the vibration of joysticks, further development in tactile sensation information channel has not been started until recent years.

Linear resonant actuators are a kind of electromagnetic systems in which a weight is loaded on a spring. They have an inherent or natural resonant frequency and typically are high quality factor systems. Therefore when an electric driving input signal stops, the oscillation response of the system will not disappear immediately but progressively weaken. This kind of residual vibration will last for some time and even affect the next vibration, so desired vibration cannot be achieved.

SUMMARY

Based on the above description, the embodiments of the present disclosure provide a tactile vibration control system and method for a smart terminal, so as to effectively constrain or eliminate the residual vibration of the linear resonant actuator.

In order to achieve the above objects, the technical solutions adopted by the embodiments of the present disclosure are as follows:

In one aspect, an embodiment of the present disclosure provides a tactile vibration control system for a smart terminal, comprising: a command generator, a tactile driver, a linear resonant actuator, a sensing module, a feedback unit and a comparator;

the command generator generates an initial commanding signal according to an input signal, adjusts the initial commanding signal to an adjusted commanding signal according to an error signal sent by the comparator and sends the adjusted commanding signal to the tactile driver;

the tactile driver generates a driving signal according to the adjusted commanding signal received and sends the generated driving signal to the linear resonant actuator; and the linear resonant actuator receives said driving signal and is driven by the driving signal to vibrate;

the sensing module comprises different types of sensors, in which each type of the sensors in real time senses a status of the linear resonant actuator and generates a corresponding sensing signal when sensing the vibration of the linear resonant actuator;

the feedback unit fuses multiple channels of sensing signals generated by the sensing module, obtains a feedback signal for estimating the vibration mode of the linear resonant actuator, and sends the feedback signal to the comparator; and the comparator compares the feedback signal with a desired signal characterizing the vibration mode of the linear resonant actuator in the input signal, generates an error signal according to the comparison result, and sends the error signal to the command generator.

In another aspect, an embodiment of the present disclosure provides a tactile vibration control method for a smart terminal, comprising:

generating an initial commanding signal according to an input signal, adjusting the initial commanding signal to an adjusted commanding signal according to the generated error signal, and generating a driving signal according to the adjusted commanding signal so that a linear resonant actuator is driven by the driving signal to vibrate;

sensing a status of the linear resonant actuator in real time by different types of sensors, and generating corresponding multiple channels of sensing signals when the sensors sense the vibration of the linear resonant actuator;

fusing the multiple channels of sensing signals so as to obtain a feedback signal for estimating the vibration mode of the linear resonant actuator; and comparing said feedback signal with a desired signal in the input signal characterizing the vibration mode of said linear resonant actuator, generating an error signal according to the comparison result and adjusting the generated initial commanding signal according to the error signal.

The beneficial effects of the embodiment of the present disclosure lie in that: with respect to the phenomenon of residual trailing occurring in the linear resonant actuator when the driving signal stops driving, the linear resonant actuator is controlled by way of close-loop control; by arranging a plurality of sensors that can monitor or sense the vibrating status of the linear resonant actuator, the sensing signals characterizing physical quantities related to the vibration mode output by the plurality of sensors are used as feedback signal so as to control the physical quantities of the vibration of the linear resonant actuator in real time. It more robustly estimates the status of the actuator and provides control by effective incorporation so as to solve the phenomenon of residual trailing occurring when the linear resonant actuator vibrates. Meanwhile, the solution of the present disclosure can achieve a technical effect of adjusting the vibrating status of the actuator in real time by feedback and adjustment in real time. Comparing the present disclosure with the processing only adopting the back electromotive force signal, the technical solution providing different types of sensors can solve the problems that the predicted physical variables related to vibration are unreliable and the feedback adjustment has poor precision when the signal-noise ratio of the back electromotive force signal is relatively low.

In a preferable embodiment, the phenomenon of residual trailing occurring in the linear resonant actuator when the driving signal stops driving is further improved by providing a filter in the present disclosure, wherein the filter is used to filter the output commanding signal by the command generator or the input signal so that when the linear resonant actuator is driven to vibrate by the driving signal generated subsequently there are a quick starting response rate and a quick braking response rate. It weakens the overlapping level of the successive vibrating events with short gaps on the time dimension, enhances the differentiation between successive vibrating events on the time dimension, effects quick starting and quick braking, and thus a desired vibration effect is achieved.

BRIEF DESCRIPTION OF THE DRAWINGS

The drawings are intended to provide further understanding of the present disclosure and constitute part of the description. The drawings explain the present disclosure in connection with the embodiments of the present disclosure but in no way limit the present disclosure. In the drawings.

DETAILED DESCRIPTION

Figure 1:
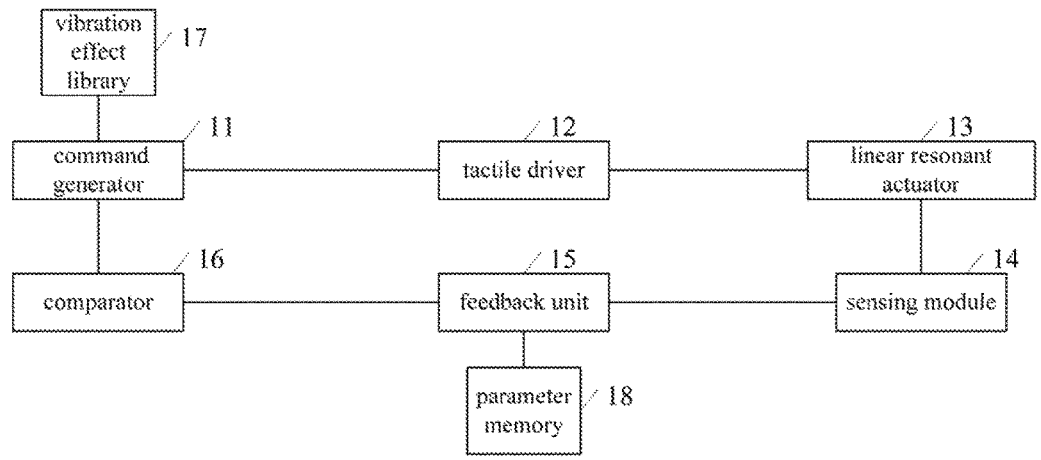
FIG. 1 is a block diagram of a tactile vibration control system for a smart terminal provided Embodiment I of the present disclosure.

To make the objects, technical solutions and advantages of the present disclosure more clear, the embodiments of the present disclosure will be described in further detail in connection with the drawings.

Tactile sensation, as an important body sensation model, has irreplaceable advantages over the senses of sight and hearing:

1. compared with visual and auditory organs, human skin has a much larger surface area and thus there are many optional locations for receiving information, such as finger tips, palms, and arms;

2. when it is not convenient to use the human visual and auditory organs, for example, when the visual and auditory organs are not available, skin can be used to receive information by means of stress or shock; and 3. information exchange via tactile channels is relatively concealed and thus of higher security.

With respect to the above advantages of tactile sensation, technology of force feedback and vibration feedback based on tactile sensation is progressively applied to the fields of consumer electronics and industrial control, and becomes an important constituent part of human-machine interaction interfaces widely used in hand-held appliances, wearing appliances, domestic appliances and industrial control devices.

An important function of tactile vibration systems is to send information. Different vibration modes represent different information, and thus it is required to precisely adjust the vibration frequency and vibration amplitude of the actuators. Eccentric rotating mass motors (ERM) and linear resonant actuators (LRA) are two types of typical actuators. The vibration frequency and vibration amplitude of the eccentric rotating mass motors cannot be controlled independently and will cause concomitant noise, while linear resonant actuators do not suffer from these problems and the time for starting and braking is shorter than eccentric rotating mass motors, and, therefore, are more widely used.

Linear resonant actuators are a kind of electromagnetic systems in which a weight is loaded on a spring. They have an inherent or natural resonant frequency and typically are high quality factor systems. Thus there will be a phenomenon of residual trailing occurring in the linear resonant actuators when the driving signal stops driving.

With respect to the phenomenon of residual trailing occurring in the linear resonant actuator when the driving signal stops driving, by arranging a plurality of sensors that can monitor or sense the vibrating status of the linear resonant actuator, the sensing signals characterizing the physical quantities related to the vibration mode output by the plurality of sensors are used as feedback signal so as to control the physical quantities of the vibration of the linear resonant actuator in real time. It more robustly estimates the status of the actuator and provides control by effective incorporation so as to solve the phenomenon of residual trailing occurring when the linear resonant actuator vibrates.

Embodiment I

FIG. 1 is a block diagram of a tactile vibration control system for a smart terminal provided by this embodiment. The smart terminal of the present disclosure may be hand-held appliances, wearable appliances (such as smart watches and smart bracelets), and industrial control devices.

As shown in FIG. 1, the tactile vibration control system of FIG. 1 is a close-loop control system, comprising: a command generator 11, a tactile driver 12, a linear resonant actuator 13, a sensing module 14, a feedback unit 15 and a comparator 16.

As shown in FIG. 1, the output port of the command generator 11 is connected to the input port of the tactile driver 12, the output port of the tactile driver 12 is connected to the input port of the linear resonant actuator 13, the output port of the linear resonant actuator 13 is connected to the input port of the sensing module 14, the output port of the sensing module 14 is connected to the output port of the feedback unit 15, the output port of the feeding unit 15 is connected to the first input port of the comparator 16, the second input port of the comparator 16 is connected to receive a desired signal and the output port of the comparator 16 is connected to the input port of the command generator 11.

The command generator 11 generates an initial commanding signal according to an input signal, adjusts the initial commanding signal to an adjusted commanding signal according to an error signal sent by the comparator 16 and sends the adjusted commanding signal to the tactile driver 12.

The command generator 11 in this embodiment can provide a PID (proportional integral derivative) control unit to adjust the generated initial commanding signal. Preferably, in every half vibration period of the linear resonant actuator, the initial commanding signal is adjusted according to the error signal, for example the wave parameters such as the amplitude, time duration or period of the corresponding wave of the initial commanding signal are adjusted.

The input signal in this embodiment can be a desired signal characterizing the vibration mode of the linear resonant actuator and a selecting command, and can be media streaming data which can be audio streaming data or video streaming data.

As shown in FIG. 1, the command generator 11 in this embodiment is also connected to a vibration effect library 17. A vibration mode list in the vibration effect library 17 records physical quantities sequence characterizing vibration effects to which different vibration modes of the linear resonant actuator corresponds.

When the input signal is a desired signal characterizing vibration mode of the linear resonant actuator and a selecting command, the command generator 11 reads the vibration mode list in the vibration effect library 17, and selects a corresponding sequence of physical quantities from the vibration mode list according to the selecting command in the input signal, the sequence of physical quantities being used as the initial commanding signal.

When the input signal is media streaming data, the command generator 11 acquires a physical signal characterizing vibration effects derived from the media streaming data, the physical signal being used as the initial commanding signal.

The tactile driver 12 generates a driving signal according to the adjusted commanding signal received and sends the generated driving signal to the linear resonant actuator 13.

The linear resonant actuator 13 receives the driving signal and is driven by the driving signal to vibrate.

The sensing module 14 comprises different types of sensors. Each type of the sensors in real time sense a status of the linear resonant actuator 13 and generates a corresponding sensing signal when it senses the vibration of the linear resonant actuator 13.

The sensing module 14 comprises a back electromotive force sensing circuit which is provided on the linear resonant actuator 13 and generates a back electromotive force signal when the linear resonant actuator vibrates; and/or,
the sensing module 14 comprises a motion sensor which is provided at a position separated from the linear resonant actuator 13 in the smart terminal, the motion sensor generating a corresponding motion sensing signal when the linear resonant actuator vibrates; and/or,
the sensing module 14 comprises a motion sensor which is provided on the linear resonant actuator 13, the motion sensor generating a corresponding motion sensing signal when the linear resonant actuator vibrates.

The motion sensors refer to the sensors that can sense important physical quantities of the linear resonant actuator in real time. The motion sensors can be sensors based on piezoelectric, ultrasound, infrared and capacitive components or the like, for example the sensors that can sense the vibration acceleration, vibration speed, vibration displacement or vibration frequency. Preferably, the motion sensors comprise one or more of acceleration sensors, laser Doppler vibrometers, microphones and gyroscopes.

The feedback unit 15 fuses multiple channels of sensing signals generated by the sensing module 14, obtains a feedback signal for estimating the vibration mode of the linear resonant actuator 13, and sends the feedback signal to the comparator 16.

The comparator 16 compares the feedback signal with a desired signal in the input signal characterizing the vibration mode of the linear resonant actuator, generates an error signal according to a comparison result, and sends the error signal to the command generator 11.

Of course, the tactile vibration control system in this embodiment also comprises a micro-controlling unit which is intended to control the signal transmission between the command generator 11, the tactile controller 12, the linear resonant actuator 13, the sensing module 14, the feedback unit 15, comparator 16 and the vibration effect library 17. That micro-controlling unit is used as the central controller of the tactile vibration control system.

The tactile vibration control system of this embodiment controls the linear resonant actuator by a close-loop control manner; by setting different types of sensors that can sense the vibrating status of the linear resonant actuator in the close-loop control, when the linear resonant actuator vibrates, by setting a plurality of sensors that can monitor or sense the vibrating status of the linear resonant actuator, the sensing signals characterizing the physical quantities related to the vibration mode output by the plurality of sensors are used as feedback signal so as to control the physical quantities of the vibration of the linear resonant actuator in real time. It more robustly estimates the status of the actuator and provides control by effective incorporation so as to solve the phenomenon of residual trailing occurring when the linear resonant actuator vibrates. Meanwhile, this embodiment can achieve a technical effect of adjusting the vibrating status of the linear resonant actuator in real time by feedback and adjustment in real time.

In addition, compared with the processing adopting only the back electromotive force signal, the technical solution providing different types of sensors of this embodiment can solve the problems that the predicted physical variables related to vibration are unreliable and the feedback adjustment has poor precision when the signal-noise ratio of the back electromotive force signal is relatively low.

In an implementation of this embodiment, the feedback unit 15 comprises: an acquisition module and a weighing module;
wherein the acquisition module receives multiple channels of sensing signals sent by the sensing module 14, acquires a physical quantity observation value of each channel of the sensing signals, and converts different types of physical quantity observation values into one and same type of physical quantity observation value under one and same reference system;
wherein the weighing module calculates a weighing coefficient of the physical quantity observation value of each channel of the sensing signals, sums the physical quantity observation value of each channel of the sensing signals according to the respective weighing coefficients, obtains a physical quantity estimation value for estimating the vibration mode of the linear resonant actuator, generates a feedback signal according to the physical quantity estimation value and then sends the feedback signal to the comparator 16; and
wherein said comparator 16 compares the physical quantity estimation value of the feedback signal with a desired value of the physical quantity in a desired signal and generates an error signal according to a comparison result.

As shown in FIG. 1, the tactile vibration control system also comprises a parameter memory 18 connected to the feedback unit 15, for storing the inherent parameters of the linear resonant actuator derived based on the physical quantity estimation value. Said inherent parameters comprise some performance parameters of the linear resonant actuator that slowly change in long term, such as parameters like internal friction of the linear resonant actuator, resonant frequency related to the spring strength, magnetic flux density or the like. The performance parameters can be duly updated by setting corresponding change thresholds. If the internal friction of the linear resonant actuator derived based on the physical quantity estimation value of the feedback signal, comparing with the current value of the parameter in the parameter memory, satisfies the change threshold, then the parameter in the parameter memory is updated with the internal friction of the linear resonant actuator derived based on the physical quantity estimation value of the feedback signal, so as to understand and manage the performance of the linear resonant actuator.

In order for better explanation of the operations of the acquisition module and weighing module of this implementation, the generations of the feedback signal and the error signal will now be described in detail by taking the examples of a BEMF (Back Electro-Motive Force) sensing circuit which can output a BEMF signal and an acceleration sensor which can output an acceleration signal.

Due to the fact that the linear resonant actuator can generate BEMF signal during vibration, one can obtain a voltage signal across the two stages of the linear resonant actuator or a current signal flowing through the linear resonant actuator by providing a respective sensing circuit. A desired BEMF signal can be obtained by removing the direct component in the voltage signal or the current signal resulted from the impedance of the linear resonant actuator. The BEMF signal comprises both information on the vibrating status of the linear resonant actuator, such as speed and acceleration, and information on certain physical parameters of the linear resonant actuator itself, such as motor factor.

This embodiment takes the physical quantity of acceleration as an example. Firstly, the acceleration observation value S1 extracted from the BEMF signal is the acceleration of the linear resonant actuator 13's own vibrator because the cback electromotive force sensing circuit is provided on the linear resonant actuator 13. If the acceleration sensor is provided on the linear resonant actuator 13, the output acceleration signal by the acceleration sensor is also the acceleration of the linear resonant actuator 13's own vibrator, and a corresponding acceleration observation value S2 is obtained from the acceleration signal.

Then the weighing coefficients of the two channels of acceleration observation values are calculated. The weighing coefficients can be calculated by signal-noise ratio or variance of the acceleration observation values; when the weighing coefficients calculated by variance, each channel of the acceleration observation values is statistically processed to obtain the variance of each channel of the acceleration observation values, and the sum of the inverses of the variances is calculated, the ratio of the inverse of the variance of each channel of the acceleration observation values and said sum of the inverses of the variances being its weighing coefficient. When calculating the weighing coefficients by the signal-noise ratio, the signal-noise ratio of each channel of the acceleration observation values is calculated and its respective weighing coefficient can be obtained by normalization of the signal-noise ratios of the two channels of acceleration observation values.

Then the acceleration estimation values EV (Estimate Value) for estimating the vibration mode of the linear resonant actuator at individual moments are calculated by means of weighted sum, and $EV(t)=\alpha S1(t)+\beta S2(t)$; wherein $\alpha+\beta=1$, $S1(t)$ is the acceleration observation value extracted from the BEMF signal at moment t, $\alpha$ is the weighing coefficient of $S1(t)$, $S2(t)$ is the acceleration observation value gathered by the acceleration sensor at moment t, and $\beta$ is the weighing coefficient of $S2(t)$.

Lastly, the acceleration estimation values EV are compared with the desired values of the acceleration DV in the input signal at each moment, for example, to generate the error signal Err(t) by the difference of the acceleration estimation value EV(t) at moment t and the desired value of the acceleration DV(t) at moment t, i.e., $Err(t)=EV(t)-DV(t)$.

It should be noted that if the acceleration sensor of this implementation is provided at a position in the smart terminal separated from the linear resonant actuator 13, then the acceleration output signal by the acceleration sensor is the acceleration of the smart terminal. The acceleration output signal by the acceleration sensor should be converted to the acceleration of the vibrator of the linear resonant actuator 13, and the conversion of the acceleration can be made by the mass ratio of the smart terminal and the vibrator.

It should be further noted that, if the physical quantity observation values extracted from the BEMF signal of this embodiment are speed observation values, two different types of physical quantity observation values should be converted to one and same type of physical quantity observation value. For example, a speed observation value extracted from the BEMF signal is converted to an acceleration observation value, or an acceleration observation value output by the acceleration sensor is converted to a speed observation value.

Figure 2:
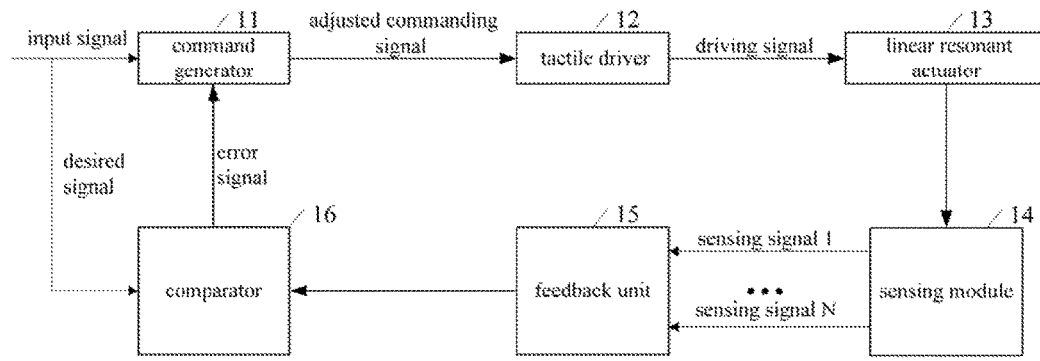
FIG. 2 shows a schematic view of the operation of the close-loop tactile vibration control system in FIG. 1.

The operation of the tactile vibration control system in this embodiment is shown in FIG. 2;

The micro-controlling unit in the smart terminal generates an input signal based on certain triggering events (such as the user pressing the touch screen), so that the command generator 11 selects an array of digital physical quantities corresponding to the desired vibration modes from the vibration effect library as the initial commanding signal in accordance with the selecting command of the input signal, or uses the analogous physical signal derived from the media streaming data in the input signal as the initial commanding signal. Then the command generator 11 adjusts the initial commanding signal according to the error signal sent by the comparator 16 and sends the adjusted commanding signal to the tactile driver 12 which generates a corresponding driving signal based on the adjusted commanding signal, wherein the driving signal can be a driving current or a driving voltage. The linear resonant actuator 13 is driven by the driving current or the driving voltage to vibrate so that the smart terminal is forced to vibrate, thus there occurs a vibration sensation at the part of the user contacting the smart terminal. The sensing module 14 senses the status of the linear resonant actuator 13 in real time. When the linear resonant actuator 13 vibrates, the sensing module 14 sends the sensing signal sensed by each type of the sensors to the feedback unit 15 for fusion of the sensing signals, and obtains a feedback signal for estimating the vibration mode of the linear resonant actuator. The comparator 16 generates a corresponding error signal by comparing the feedback signal with a desired signal and sends the generated error signal to the commanding controller 11.

Embodiment II

By analyzing the phenomenon of residual trailing occurring in the linear resonant actuators when the driving signal stops driving, the present disclosure finds that: the phenomenon of residual trailing is totally decided by the convolution of the driving signal and the impulse response of the linear resonant actuators. Thus the present disclosure changes, by processing the driving signal, the output following its convolution with the impulse response of the linear resonant actuators, so as to solve the phenomenon of residual trailing occurring when the linear resonant actuator vibrates.

Figure 3:
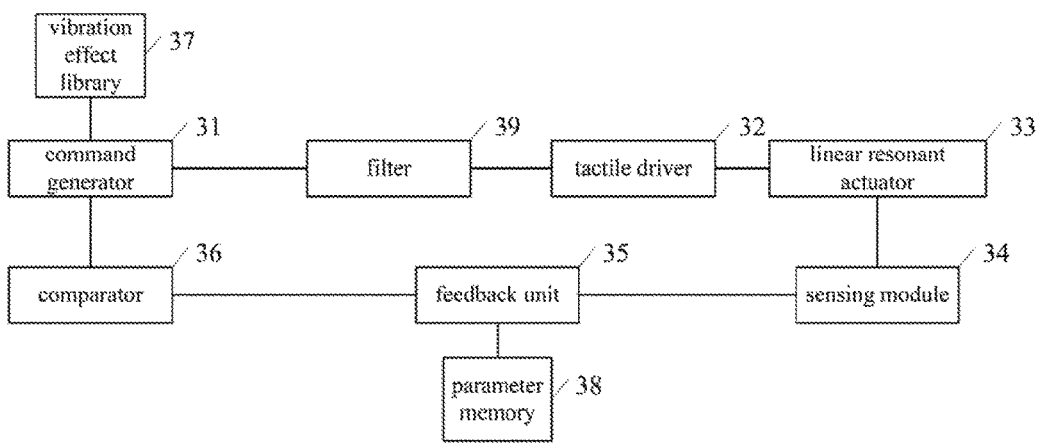
FIG. 3 is a block diagram of a tactile vibration control system for a smart terminal provided by Embodiment II of the present disclosure.

FIG. 3 is a block diagram of a tactile vibration control system for a smart terminal provided by this embodiment. As shown in FIG. 3, the tactile vibration control system also comprises a filter 39. This embodiment requires the driving signal generated by the commanding signal which was processed by the filter to have an overdriving feature in the initial time period and have an initiative braking feature in the ending time period.

As shown in FIG. 3, the output port of the command generator 31 is connected to the input port of the filter 39, the output port of the filter 39 is connected to the input port of the tactile driver 32, the output port of the tactile driver 32 is connected to the input port of the linear resonant actuator 33, the output port of the linear resonant actuator 33 is connected to the input port of the sensing module 34, the output port of the sensing module 34 is connected to the input port of the feedback unit 35, the output port of the feedback unit 35 is connected to the input port of the comparator 36 and the output port of the comparator 36 is connected to the input port of the command generator 31.

As shown in FIG. 3, the filter 39 filters the adjusted commanding signal and sends the filtered commanding signal to the tactile driver 32; wherein the amplitudes of a predetermined number of initial pulses of the filtered commanding signal are larger than a set threshold and phases of a predetermined number of ending pulses reverse. The operations of the command generator 31, the tactile driver 32, the linear resonant actuator 33, the sensing module 34, the feedback unit 35, and the comparator 36 in this embodiment can be referred to the relevant description of Embodiment I, which will not be repeated.

It should be noted that the filter of this embodiment is a post module of the command generator and connected between the command generator and the tactile controller. The filter can also be a preposition module of the command generator wherein its output port is connected to the input of the command generator, and wherein the filter filters the input signal and sends the filtered input signal to the command generator; and wherein the amplitudes of a predetermined number of initial pulses of the initial commanding signal generated by the command generator are larger than a set threshold and phases of a predetermined number of ending pulses reverse.

The parameters of the filter in this embodiment are decided by the impulse response of the linear resonant actuator. Preferably, the time domain signal of the filter is an impulse signal. As shown in FIG. 3, the tactile vibration control system of this embodiment is also provided with a parameter memory 38 connected to the filter 39. The inherent parameters of the linear resonant actuator stored in the parameter memory 38 comprise some performance parameters of the linear resonant actuator that slowly change in long term, such as parameters like internal friction of the linear resonant actuator, resonant frequency related to the spring strength, magnetic flux density or the like, and also comprise relevant parameters for calculating the damped resonant period and the damping ratio of the linear resonant actuator so that the impulse moment and impulse amplitude of each impulse of the impulse signal can be calculated by means of the damped resonant period and the damping ratio calculated.

When designing the filter 39, the damped resonant period of the linear resonant actuator 33 can be calculated by the resonant frequency and the damping ratio of the linear resonant actuator 33; for example, the damped resonant period $T_d$ of the linear resonant actuator is calculated based on the formula $$T_d = \frac{1}{\sqrt{1-\zeta^2}\, f_n},$$

and then the impulse moment of each impulse of the impulse signal is determined by the damped resonant period $T_d$; and the impulse amplitude of each impulse is calculated by the damping ratio of the linear resonant actuator 33; for example, the impulse amplitude is calculated according to the formula $$A = \frac{1}{1 + e^{\frac{-\zeta\pi}{\sqrt{1-\zeta^2}}}};$$

wherein, $f_n$ is the resonant frequency of the linear resonant actuator, and $\zeta$ is the damping ratio of the linear resonant actuator.

Assuming that the impulse signal comprises two impulses in this embodiment, the constraint conditions for the impulse moment and impulse amplitude of the impulse signal are: $t_1=0$, $A_1+A_2=1$, wherein $t_1$ and $t_2$ are the impulse moments of the first impulse and the second impulse respectively, and $A_1$ and $A_2$ are the impulse amplitudes of the first impulse and the second impulse respectively.

If the resonant frequency of the linear resonant, actuator is $f_n$175 Hz and the damping ratio $\zeta=0.028$, then in accordance with the above calculating formula for the damped resonant period of the linear resonant actuator, it can be calculated that the damped resonant period $T_d=5.8$ ms, then the impulse moment of the first impulse $t_1=0$, and the impulse amplitude $$A_1 = \frac{1}{1 + e^{\frac{-\zeta\pi}{\sqrt{1-\zeta^2}}}} = 0.522;$$

and the impulse moment of the second impulse $$t_2 = \frac{1}{2}T_d = 2.9 \text{ ms},$$

and the impulse amplitude $A_2=1-A_1=0.478$.

Figure 4A:
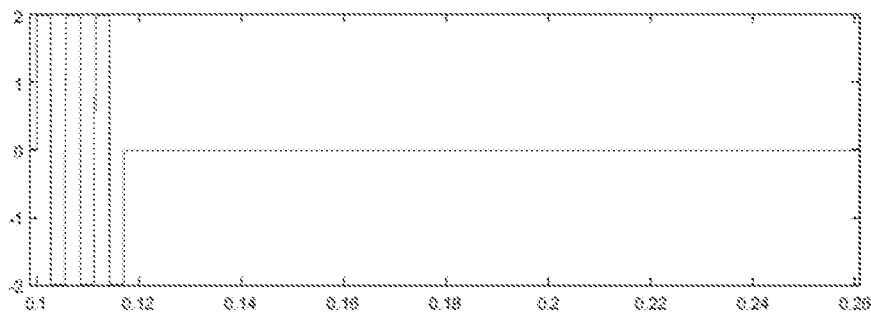
FIG. 4a is a schematic view of the commanding signal without filtering processing provided by Embodiment II of the present disclosure.
Figure 4B:
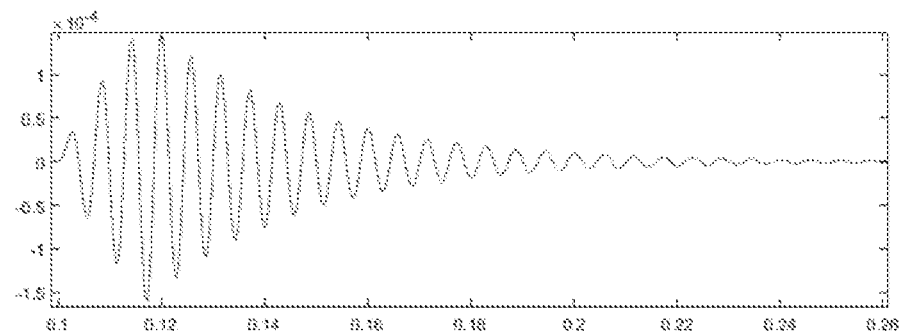
FIG. 4b is a displacement view of the vibrator of the linear resonant actuator without filtering processing provided by Embodiment II of the present disclosure.
Figure 5A:
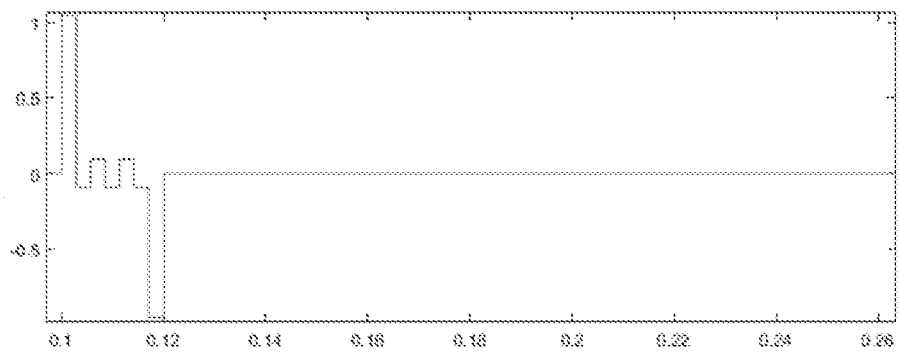
FIG. 5a is a schematic view of the commanding signal after filtering processing provided by Embodiment II of the present disclosure.
Figure 5B:
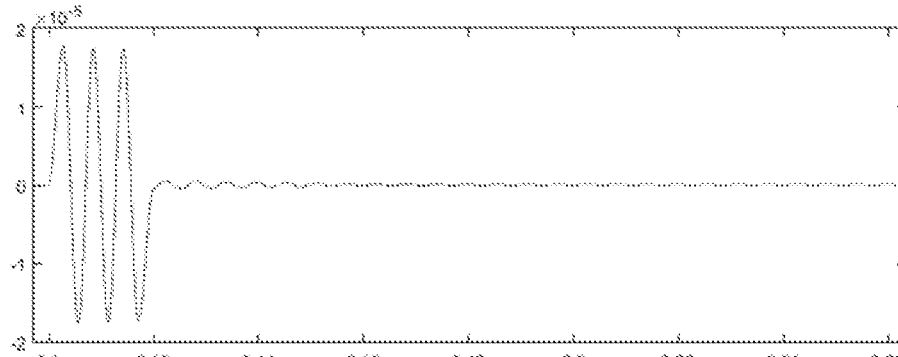
FIG. 5b is a displacement view of the vibrator of the linear resonant actuator after filtering processing provided by Embodiment II of the present disclosure.

FIGS. 4a and 4b are a schematic view of the commanding signal without filtering processing and a displacement view of the vibrator of the linear resonant actuator respectively, and FIGS. 5a and 5b are a schematic view of the commanding signal after being filtering processed and a displacement view of the vibrator of the linear resonant actuator respectively. It can be seen from FIG. 4a that FIG. 4a schematically shows a rectangular wave commanding signal with 4 periods and at the starting moment of the fourth period, there is no commanding signal output. The commanding signal shown in FIG. 5a is obtained by filtering the commanding signal shown in FIG. 4a with the filter according to the present disclosure. It can be seen from FIG. 5a that the commanding signal corresponding to the first half period of the first period presents a pulse signal, that is, the amplitudes of the commanding signal corresponding to the first half period of the first period are much larger than the amplitudes of the commanding signal corresponding to the last half period of that period (it can be seen from FIG. 5a that the amplitudes of the commanding signal corresponding to the last half period are closed to 0); the commanding signal corresponding to the first half period of the fourth period presents a pulse signal, that is, the amplitudes of the commanding signal corresponding to the first half period of the fourth period are much larger than the amplitudes of the commanding signal corresponding to the last half period (it can be seen from FIG. 5a that the amplitudes of the commanding signal corresponding to the last half period are 0), and the phases of the pulse signal reverse by 180°. The corresponding commanding signal in the second and the third periods presents a rectangular wave signal with peaks close to 0.

Comparing FIG. 4a with FIG. 5a, it can be seen that the commanding signal after filtering processing presents a pulse signal in both the initial and end phases. FIG. 4a schematically shows that there is one pulse in both the initial and end phases and the phase of the pulse in the end phase reverses by 180° with the middle phase presenting a periodical signal with peaks close to 0. Thus the driving signal is generated by the commanding signal in FIG. 4a so that when the linear resonant actuator is driven to vibrate, the linear resonant actuator can be driven quickly into a stable vibrating status and quickly stopped from vibrating, and can effectively inhibit the residual trailing. It should be noted that FIG. 4a merely schematically shows the situation that there is one pulse in both the initial and end phases. In practice, the present disclosure is not limited to the number of the pulses depending on the number of pulses for desire design.

Comparing FIG. 4b with FIG. 5b, it can be seen that the linear resonant actuator of FIG. 5b has a vibration effect of fast starting and fast braking, and can well inhibit the residual trailing. That is, the linear resonant actuator of FIG. 4b slowly enters into a stable vibrating status and creates a long trailing at the end of the vibration; whereas the linear resonant actuator of FIG. 5b can quickly enter into a stable vibrating status and quickly stop vibrating, and creates almost no residual trailing at the end of the vibration. It can be seen that the driving signal generated by the filtered commanding signal has features of overdriving and initiative inhibition that is it can drive the linear resonant actuator quickly into a stable vibrating status and effectively inhibit the residual trailing at the end of vibration.

By adding a filter in the tactile vibration control system of this embodiment, the filter is used to filter the initial commanding signal generated by the command generator so that when the linear resonant actuator is driven to vibrate by the driving signal generated subsequently there are a quick starting response and a quick braking response. It weakens the overlapping level of the successive vibrating events with short gaps on the time dimension, enhances the differentiation between successive vibrating events on the time dimension, effects quick starting and quick braking, and thus it is ensured that a desired vibration effect is achieved.

Figure 6:
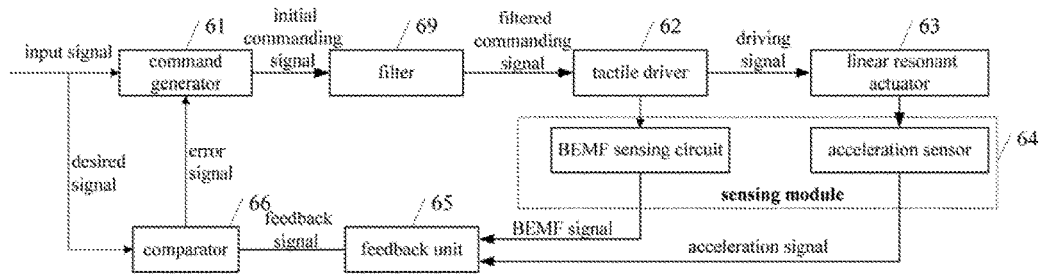
FIG. 6 shows a schematic view of the operation of a close-loop tactile vibration control system.

As shown in FIG. 6, FIG. 6 shows a schematic view of the operation of a close-loop tactile vibration control system. The filter 69 in FIG. 6 constitutes part of the close-loop tactile vibration control system and is connected between the command generator 61 and the tactile controller 62 in order to filter the adjusted commanding signal so that the commanding signal after filtering processing has an overdriving feature in the initial time period and an initiative braking feature in the ending time period.

Figure 7:
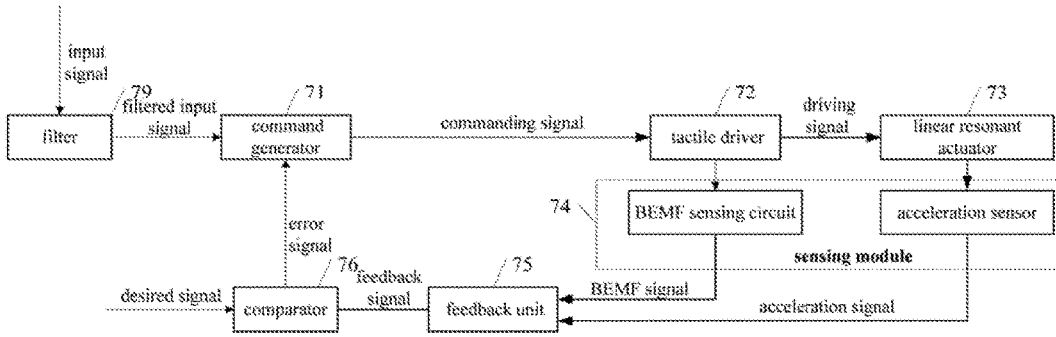
FIG. 7 shows a schematic view of the operation of another close-loop tactile vibration control system.

As shown in FIG. 7, FIG. 7 shows another schematic view of the operation of a close-loop tactile vibration control system. The output of the filter 79 in FIG. 7 is connected to the input port of the command generator 71 in order to filter the input signal and send the filtered input signal to the command generator 71. The command generator 71 sends the generated commanding signal to the tactile driver 72, and the driving output signal by the tactile driver 72 has an overdriving feature in the initial time period and an initiative braking feature in the ending time period.

The operations of the tactile controllers 62, 72, the linear resonant actuators 63, 73, the sensing modules 64, 74, the feedback units 65, 75, and the comparators 66, 76 in FIGS. 6 and 7 may be referred to the relevant description of this embodiment, which will not be repeated.

As shown in FIG. 6, the operation of the tactile vibration control system is as follows:

Firstly, the micro-controlling unit in the smart terminal generates an input signal based on certain triggering events (such as the user pressing the touch screen), so that the command generator 61 selects an sequence of digital physical quantities corresponding to the desired vibration mode from the vibration effect library as the initial commanding signal in accordance with the selecting command of the input signal, or uses the analogous physical signal derived from the media streaming data in the input signal as the initial commanding signal. Then the command generator 61 adjusts the above initial commanding signal to an adjusted commanding signal according to the error signal transited by the comparator 66 and sends the adjusted commanding signal to the filter 69.

Then the filter 69 of the FIG. 6 filters the adjusted commanding output signal by the command generator 61 and sends the commanding signal after filtering processing to the tactile driver 62 which generates a corresponding driving signal based on the filtered commanding signal, wherein the driving signal can be a driving current or a driving voltage. The linear resonant actuator 63 is driven by the driving current or the driving voltage to vibrate so that the smart terminal is forced to vibrate, and thus the part of the user contacting the smart terminal will feel the vibration sensation.

Lastly, the sensing module 64 (FIG. 6 schematically shows the sensing module comprising the BEMF sensing circuit and the acceleration sensor) senses the status of the linear resonant actuator in real time. When the linear resonant actuator vibrates, the sensing module 64 sends the sensing signal sensed by each type of the sensors to the feedback unit for fusion of the sensing signals, and obtains a feedback signal for estimating the vibration mode of the linear resonant actuator. The comparator 66 generates a corresponding error signal by comparing the feedback signal with a desired signal, so that the command controller adjusts the generated initial commanding signal according to the error signal.

As shown in FIG. 7, the operation of the tactile vibration control system is as follows:

Firstly, the micro-controlling unit in the smart terminal generates an input signal based on certain triggering events (such as the user pressing the touch screen), and the filter 79 filters the input signal and sends the input signal after being filtering processed to the command generator 71.

Then the command generator 71 selects a sequence of digital physical quantities corresponding to the desired vibration modes from the vibration effect library 15 as the initial commanding signal in accordance with the selecting command of the input signal, or uses the analogous physical signal derived from the media streaming data in the input signal as the initial commanding signal. Then the command generator 71 adjusts the above initial commanding signal to an adjusted commanding signal according to the error signal sent by the comparator 76, and sends the adjusted commanding signal to the tactile driver 72 which generates a corresponding driving signal based on the filtered commanding signal, wherein the driving signal can be a driving current or a driving voltage; the linear resonant actuator 73 is driven by the driving current or the driving voltage to vibrate so that the smart terminal is forced to vibrate, and thus the part of the user contacting the smart terminal will feel the vibration sensation.

Lastly, the sensing module 74 (FIG. 7 schematically shows the sensing module comprising the BEMF sensing circuit and the acceleration sensor) which senses the status of the linear resonant actuator in real time. When the linear resonant actuator 73 vibrates, the sensing module sends the sensing signal sensed by each type of the sensors to the feedback unit for fusion of the sensing signals, and obtains a feedback signal for estimating the vibration mode of the linear resonant actuator. The comparator generates a corresponding error signal by comparing the feedback signal with a desired signal, so that the command controller 71 adjusts the generated initial commanding signal according to the error signal.

Embodiment III

Based on the technical concept the same as the Embodiments I and II, this embodiment provides a tactile vibration control method for a smart terminal.

Figure 8:
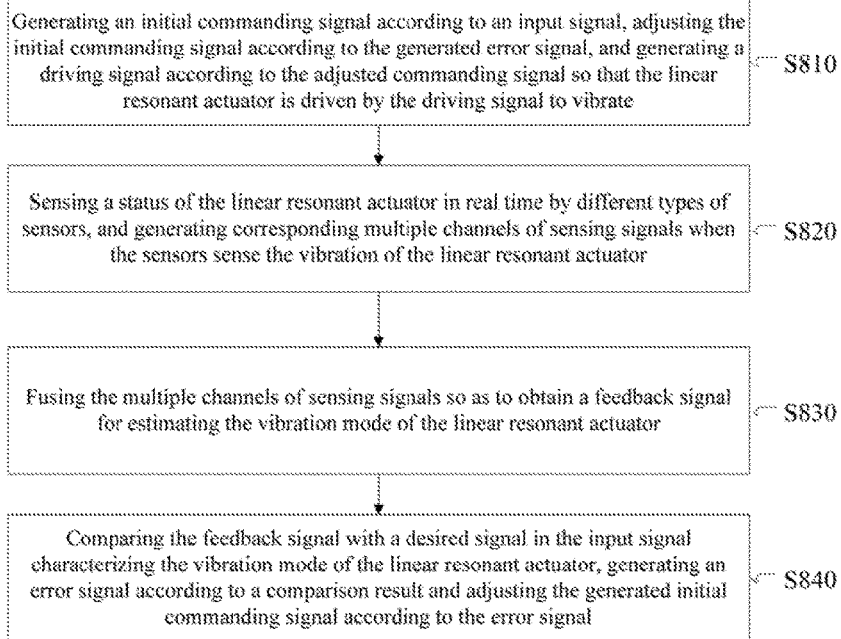
FIG. 8 is a flow diagram of a tactile vibration control method for a smart terminal provided by Embodiment III of the present disclosure.

As shown in FIG. 8, FIG. 8 is a tactile vibration control method for a smart terminal provided by this embodiment, said control method comprising:

S810, generating an initial commanding signal according to an input signal, adjusting the initial commanding signal according to the generated error signal, and generating a driving signal according to the adjusted commanding signal so that the linear resonant actuator is driven by the driving signal to vibrate.

Said generating an initial commanding signal according to an input signal in this step is particularly:

reading a vibration mode list in a vibration effect library, and selecting a sequence of physical quantities corresponding to a desired vibration mode and characterizing vibration effect from the vibration mode list according to a selecting command in the input signal, the sequence of physical quantities being used as the initial commanding signal; or acquiring, from media streaming data in the input signal, a physical signal characterizing vibration effect derived from the media streaming data, the physical signal being used as the initial commanding signal.

S820, sensing a status of the linear resonant actuator in real time by different types of sensors, and generating corresponding multiple channels of sensing signals when the sensors sense the vibration of the linear resonant actuator.

In practice, the vibrating status of the linear resonant actuator can be sensed by the sensors such as motion sensors and a back electromotive force sensing circuit.

For example, this embodiment can provide a back electromotive force sensing circuit on the linear resonant actuator which generates a back electromotive force signal when the linear resonant actuator vibrates; this embodiment can also provide a motion sensor at a position separated from the linear resonant actuator in the smart terminal which generates a corresponding motion sensing signal when the linear resonant actuator vibrates; and of course this embodiment may also provide a motion sensor on the linear resonant actuator which generates a corresponding motion sensing signal when the linear resonant actuator vibrates; wherein, the motion sensors at least comprise one or more of acceleration sensors, laser Doppler vibrometers, microphones and gyroscopes.

S830, fusing the multiple channels of sensing signals so as to obtain a feedback signal for estimating the vibration mode of the linear resonant actuator.

S840, comparing the feedback signal with a desired signal in the input signal characterizing the vibration mode of the linear resonant actuator, generating an error signal according to a comparison result and adjusting the generated initial commanding signal according to the error signal.

In a preferable embodiment of this embodiment, the fusing the multiple channels of sensing signals so as to obtain a feedback signal for estimating the vibration mode of the linear resonant actuator in step S830 is particularly:

acquiring a physical quantity observation value of each channel of the sensing signals, and converting different types of physical quantity observation values into one and same type of physical quantity observation value under one and same reference system; and calculating a weighing coefficient of the physical quantity observation value of each channel of the sensing signals, summing the physical quantity observation values of each channel of the sensing signals according to the respective weighing coefficients, obtaining a physical quantity estimation value for estimating the vibration mode of the linear resonant actuator, generating a feedback signal according to the physical quantity estimation value and then sending the feedback signal to said comparator.

Then, the comparing the feedback signal with a desired signal in the input signal characterizing the vibration mode of the linear resonant actuator in step S840 is particularly: comparing the physical quantity estimation value of the feedback signal with a desired value of the physical quantity in a desired signal and generating an error signal according to a comparison result.

The detailed implementation of each step in the preferable embodiment can be referred to the description of the tactile vibration control system of the Embodiment I of the present disclosure, which will not be repeated.

In another preferable embodiment of this embodiment, said generating a driving signal according to the adjusted commanding signal in step S810 is particularly:

providing a filter, the filter filtering the adjusted commanding signal so that amplitudes of a predetermined number of initial pulses of the filtered commanding signal are larger than a set threshold and phases of a predetermined number of ending pulses reverse.

Or, said generating an initial commanding signal according to an input signal in step S810 is particularly:

providing a filter, filtering the input signal by the filter, and generating an initial commanding signal according to the filtered input signal, so that amplitudes of a predetermined number of initial pulses of the generated initial commanding signal are larger than a set threshold and phases of a predetermined number of ending pulses reverse.

A time domain signal of the filter in this preferable embodiment is an impulse signal, and the filter may be set by the following method:

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

As an exemplary example, the impulse signal comprises two impulses, and the impulse moment and impulse amplitude of each impulse are calculated by the following formula:

$$\begin{cases} t_1 = 0, A_1 = \dfrac{1}{1 + e^{\frac{-\zeta\pi}{\sqrt{1-\zeta^2}}}} \\ t_2 = \sigma g \dfrac{1}{\sqrt{1-\zeta^2}\, f_n}, A_2 = 1 - A_1 \end{cases} ;$$

wherein $t_1$ and $t_2$ are the impulse moments of the first impulse and the second impulse respectively, $A_1$ and $A_2$ are the impulse amplitudes of the first impulse and the second impulse respectively, $f_n$ is the resonant frequency of the linear resonant actuator, $\zeta$ is the damping ratio of the linear resonant actuator, and $\sigma$ is a constant larger than 0 and smaller than 1.

The detailed implementation of each step in the preferable embodiment can be referred to the description of the tactile vibration control system of the Embodiment II of the present disclosure, which will not be repeated.

In summary, with respect to the phenomenon of residual trailing occurring in the linear resonant actuator when the driving signal stops driving, the linear resonant actuator is controlled by way of close-loop control; by setting a plurality of sensors that can monitor or sense the vibrating status of the linear resonant actuator, the sensing signals characterizing the physical quantities related to the vibration modes output by the plurality of sensors are used as feedback signal so as to control the physical quantities of the vibration of the linear resonant actuator in real time. It more robustly estimates the status of the actuator and provides control by effective incorporation so as to solve the phenomenon of residual trailing occurring when the linear resonant actuator vibrates. Meanwhile, the solution can achieve a technical effect of adjusting the vibrating status of the actuator in real time by feedback and adjustment in real time. Comparing the present disclosure with the processing only adopting the back electromotive force signal, the technical solution providing different types of sensors can solve the problems that the predicted physical variables related to vibration are unreliable and the feedback adjustment has poor precision when the signal-noise ratio of the back electromotive force signal is relatively low. In a preferable embodiment, the phenomenon of residual trailing occurring in the linear resonant actuator when the driving signal stops driving is further improved by providing a filter in the present disclosure, wherein the filter is used to filter the commanding output signal by the command generator or the input signal so that when the linear resonant actuator is driven to vibrate by the driving signal generated subsequently there are a quick starting response rate and a quick braking response rate. It weakens the overlapping level of the successive vibrating events with short gaps on the time dimension, enhances the differentiation between successive vibrating events on the time dimension, effects quick starting and quick braking, and thus a desired vibration effect is achieved.

The above described are merely preferable embodiments of the present disclosure and are not intended to limit the protection scope of the present disclosure. Any modification, equivalent alternation and development made within the scope and principle of the present disclosure fall within the protection scope of the present disclosure.

The invention claimed is:

1. Tactile vibration control system for a smart terminal, comprises: a command generator, a tactile driver, a filter, a linear resonant actuator, a sensing module, a feedback unit and a comparator;

the command generator generates an initial commanding signal according to an input signal, adjusts the initial commanding signal to an adjusted commanding signal according to an error signal sent by the comparator and sends the adjusted commanding signal to the tactile driver;

the tactile driver generates a driving signal according to the adjusted commanding signal received and sends the generated driving signal to the linear resonant actuator;

the filter is connected between the command generator and the tactile driver, the filter filtering the adjusted commanding signal so that amplitudes of a predetermined number of initial pulses of the filtered commanding signal are larger than a set threshold and phases of a predetermined number of ending pulses reverse;

the linear resonant actuator receives the driving signal and is driven by the driving signal to vibrate;

the sensing module comprises different types of sensors in which each type of the sensors in real time senses a status of the linear resonant actuator and generates a corresponding sensing signal when sensing the vibration of the linear resonant actuator;

the feedback unit fuses multiple channels of sensing signals generated by the sensing module, obtains a feedback signal for estimating the vibration mode of the linear resonant actuator, and sends the feedback signal to the comparator; and the comparator compares the feedback signal with a desired signal characterizing the vibration mode of the linear resonant actuator in the input signal, generates an error signal according to the comparison result, and sends the error signal to the command generator.

2. Tactile vibration control system according to claim 1, wherein the feedback unit comprises: an acquisition module and a weighing module;

the acquisition module receives the multiple channels of sensing signals sent by the sensing module, acquires a physical quantity observation value of each channel of the sensing signals, and converts different types of physical quantity observation values into one and same type of physical quantity observation value under one and same reference system;

the weighing module calculates a weighing coefficient of the physical quantity observation value of each channel of the sensing signals, sums the physical quantity observation value of each channel of the sensing signals according to the respective weighing coefficient, obtains a physical quantity estimation value for estimating the vibration mode of the linear resonant actuator, generates the feedback signal according to the physical quantity estimation value and then sends the feedback signal to the comparator; and the comparator compares the physical quantity estimation value of the feedback signal with a desired value of the physical quantity in the desired signal and generates an error signal according to a comparison result.

3. Tactile vibration control system according to claim 1, wherein the sensing module comprises a back electromotive force sensing circuit which is provided on the linear resonant actuator and generates a back electromotive force signal when the linear resonant actuator vibrates; and/or, the sensing module comprises a motion sensor which is provided at a position separated from the linear resonant actuator in the smart terminal, the motion sensor generating a corresponding motion sensing signal when the linear resonant actuator vibrates; and/or, the sensing module comprises a motion sensor which is provided on the linear resonant actuator, the motion sensor generating a corresponding motion sensing signal when the linear resonant actuator vibrates;

wherein, the motion sensors at least comprise one or more of acceleration sensors, laser Doppler vibrometers, microphones and gyroscopes.

4. Tactile vibration control system according to claim 1, wherein the command generator reads a vibration mode list in a vibration effect library, and selects a sequence of physical quantities corresponding to a desired vibration mode and characterizing vibration effect from the vibration mode list according to a selecting command in the input signal, the sequence of physical quantities being used as the initial commanding signal; or the command generator acquires from media streaming data in the input signal a physical signal characterizing vibration effect derived from the media streaming data, the physical signal being used as the initial commanding signal.

5. Tactile vibration control system according to claim 1, wherein a time domain signal of the filter is an impulse signal, and the filter is set by the following method:

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

6. Tactile vibration control system according to claim 5, wherein the impulse signal comprises two impulses, and the impulse moment and impulse amplitude of each impulse are calculated by the following formula:

$$\begin{cases} t_1 = 0, A_1 = \dfrac{1}{1+e^{\frac{-\zeta\pi}{\sqrt{1-\zeta^2}}}} \\ t_2 = \sigma g \dfrac{1}{\sqrt{1-\zeta^2}\, f_n}, A_2 = 1 - A_1 \end{cases};$$

wherein $t_1$ and $t_2$ are the impulse moments of a first impulse and a second impulse respectively, $A_1$ and $A_2$ are the impulse amplitudes of the first impulse and the second impulse respectively, $f_n$ is the resonant frequency of the linear resonant actuator, $\zeta$ is the damping ratio of the linear resonant actuator, and $\sigma$ is a constant larger than 0 and smaller than 1.

7. Tactile vibration control system according to claim 5, wherein the tactile vibration control system also comprises a parameter memory, the parameter memory storing inherent parameters of the linear resonant actuator derived based on physical variable estimation values of the feedback signal.

8. Tactile vibration control method for a smart terminal, comprises:

generating an initial commanding signal according to an input signal, adjusting the initial commanding signal to an adjusted commanding signal according to the generated error signal, and generating a driving signal according to the adjusted commanding signal so that a linear resonant actuator is driven by the driving signal to vibrate;

sensing a status of the linear resonant actuator in real time by different types of sensors, and generating corresponding multiple channels of sensing signals when the sensors sense the vibration of the linear resonant actuator;

fusing the multiple channels of sensing signals so as to obtain a feedback signal for estimating the vibration mode of the linear resonant actuator; and comparing the feedback signal with a desired signal in the input signal characterizing the vibration mode of the linear resonant actuator, generating an error signal according to a comparison result and adjusting the generated initial commanding signal according to the error signal;

wherein the generating an initial commanding signal according to an input signal, and adjusting the initial commanding signal according to the generated error signal comprises:

providing a filter, the filter filtering the adjusted commanding signal so that amplitudes of a predetermined number of initial pulses of the filtered commanding signal are larger than a set threshold and phases of a predetermined number of ending pulses reverse; or providing a filter, filtering the input signal by the filter, and generating an initial commanding signal according to the filtered input signal, so that the amplitudes of a predetermined number of initial pulses of the generated initial commanding signal are larger than a set threshold and phases of a predetermined number of ending pulses reverse.

9. Tactile vibration control method according to claim 8, wherein the fusing the multiple channels of sensing signals so as to obtain a feedback signal for estimating the vibration mode of the linear resonant actuator comprises:

acquiring a physical quantity observation value of each channel of the sensing signals, and converting different types of physical quantity observation values into one and same type of physical quantity observation value under one and same reference system; and calculating a weighing coefficient of the physical quantity observation value of each channel of the sensing signals, summing the physical quantity observation values of each channel of the sensing signals according to the respective weighing coefficients, obtaining a physical quantity estimation value for estimating the vibration mode of the linear resonant actuator, and generating a feedback signal according to the physical quantity estimation value; and the comparing the feedback signal with a desired signal in the input signal characterizing the vibration mode of the linear resonant actuator, and generating an error signal according to a comparison result is particularly:

comparing the physical quantity estimation value of the feedback signal with a desired value of the physical quantity in the desired signal and generating an error signal according to a comparison result.

10. Tactile vibration control method according to claim 8, wherein the sensing a status of the linear resonant actuator in real time by different types of sensors, and generating corresponding multiple channels of sensing signals when the sensors sense the vibration of the linear resonant actuator is particularly:

providing a back electromotive force sensing circuit on the linear resonant actuator, the back electromotive force sensing circuit generating the back electromotive force signal when the linear resonant actuator vibrates; and/or, providing a motion sensor at a position separated from the linear resonant actuator in the smart terminal, the motion sensor generating a corresponding motion sensing signal when the linear resonant actuator vibrates; and/or, providing a motion sensor on the linear resonant actuator, the motion sensor generating a corresponding motion sensing signal when the linear resonant actuator vibrates; wherein, the motion sensors at least comprise one or more of acceleration sensors, laser Doppler vibrometers, microphones and gyroscopes.

11. Tactile vibration control method according to claim 8, wherein the generating an initial commanding signal according to an input signal comprises:

reading a vibration mode list in a vibration effect library, and selecting a sequence of physical quantities corresponding to a desired vibration mode and characterizing vibration effect from the vibration mode list according to a selecting command in the input signal, the sequence of physical quantities being used as the initial commanding signal; or acquiring from media streaming data in the input signal a physical signal characterizing vibration effect derived from the media streaming data, the physical signal being used as the initial commanding signal.

12. Tactile vibration control method according to claim 8, wherein a time domain signal of the filter is an impulse signal, and the setting a filter comprises:

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

13. Tactile vibration control system for a smart terminal, comprises: a command generator, a tactile driver, a filter, a linear resonant actuator, a sensing module, a feedback unit and a comparator;

the command generator generates an initial commanding signal according to an input signal, adjusts the initial commanding signal to an adjusted commanding signal according to an error signal sent by the comparator and sends the adjusted commanding signal to the tactile driver;

the tactile driver generates a driving signal according to the adjusted commanding signal received and sends the generated driving signal to the linear resonant actuator;

the output port of the filter is connected to the input of the command generator, wherein the filter filters the input signal and sends the filtered input signal to the command generator; wherein the amplitudes of a predetermined number of initial pulses of the initial commanding signal generated by the command generator are larger than a set threshold and phases of a predetermined number of ending pulses reverse;

the linear resonant actuator receives the driving signal and is driven by the driving signal to vibrate;

the sensing module comprises different types of sensors in which each type of the sensors in real time senses a status of the linear resonant actuator and generates a corresponding sensing signal when sensing the vibration of the linear resonant actuator;

the feedback unit fuses multiple channels of sensing signals generated by the sensing module, obtains a feedback signal for estimating the vibration mode of the linear resonant actuator, and sends the feedback signal to the comparator; and the comparator compares the feedback signal with a desired signal characterizing the vibration mode of the linear resonant actuator in the input signal, generates an error signal according to the comparison result, and sends the error signal to the command generator.

14. Tactile vibration control system according to claim 13, wherein the feedback unit comprises: an acquisition module and a weighing module;

the acquisition module receives the multiple channels of sensing signals sent by the sensing module, acquires a physical quantity observation value of each channel of the sensing signals, and converts different types of physical quantity observation values into one and same type of physical quantity observation value under one and same reference system;

the weighing module calculates a weighing coefficient of the physical quantity observation value of each channel of the sensing signals, sums the physical quantity observation value of each channel of the sensing signals according to the respective weighing coefficient, obtains a physical quantity estimation value for estimating the vibration mode of the linear resonant actuator, generates the feedback signal according to the physical quantity estimation value and then sends the feedback signal to the comparator; and the comparator compares the physical quantity estimation value of the feedback signal with a desired value of the physical quantity in the desired signal and generates an error signal according to a comparison result.

15. Tactile vibration control system according to claim 13, wherein the sensing module comprises a back electromotive force sensing circuit which is provided on the linear resonant actuator and generates a back electromotive force signal when the linear resonant actuator vibrates; and/or, the sensing module comprises a motion sensor which is provided at a position separated from the linear resonant actuator in the smart terminal, the motion sensor generating a corresponding motion sensing signal when the linear resonant actuator vibrates; and/or, the sensing module comprises a motion sensor which is provided on the linear resonant actuator, the motion sensor generating a corresponding motion sensing signal when the linear resonant actuator vibrates;

wherein, the motion sensors at least comprise one or more of acceleration sensors, laser Doppler vibrometers, microphones and gyroscopes.

16. Tactile vibration control system according to claim 13, wherein the command generator reads a vibration mode list in a vibration effect library, and selects a sequence of physical quantities corresponding to a desired vibration mode and characterizing vibration effect from the vibration mode list according to a selecting command in the input signal, the sequence of physical quantities being used as the initial commanding signal; or the command generator acquires from media streaming data in the input signal a physical signal characterizing vibration effect derived from the media streaming data, the physical signal being used as the initial commanding signal.

17. Tactile vibration control system according to claim 13, wherein a time domain signal of the filter is an impulse signal, and the filter is set by the following method:

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

18. Tactile vibration control system according to claim 17, wherein the impulse signal comprises two impulses, and the impulse moment and impulse amplitude of each impulse are calculated by the following formula:

$$\begin{cases} t_1 = 0, A_1 = \dfrac{1}{1 + e^{\frac{-\zeta\pi}{\sqrt{1-\zeta^2}}}} \\ t_2 = \sigma g \dfrac{1}{\sqrt{1-\zeta^2}\, f_n}, A_2 = 1 - A_1 \end{cases};$$

wherein $t_1$ and $t_2$ are the impulse moments of a first impulse and a second impulse respectively, $A_1$ and $A_2$ are the impulse amplitudes of the first impulse and the second impulse respectively, $f_n$ is the resonant frequency of the linear resonant actuator, $\zeta$ is the damping ratio of the linear resonant actuator, and $\sigma$ is a constant larger than 0 and smaller than 1.

19. Tactile vibration control system according to claim 17, wherein the tactile vibration control system also comprises a parameter memory, the parameter memory storing inherent parameters of the linear resonant actuator derived based on physical variable estimation values of the feedback signal.

* * * * *